3,772,275
ANTIDEPRESSIVE MORPHOLINO COMPOUNDS
AND METHODS OF PRODUCING THE SAME
Sven E. H. Hernestam, Malmo, Sweden, and Richard F. Squires, Olstykke, Denmark, assignors to A/S Ferrosan, Soborg, Denmark
No Drawing. Filed Mar. 23, 1970, Ser. No. 22,014
Claims priority, application Great Britain, Mar. 21, 1969, 15,052/69
Int. Cl. C07d 87/40
U.S. Cl. 260—247.5 R          1 Claim

ABSTRACT OF THE DISCLOSURE

Butyrophenone derivatives of the general formula

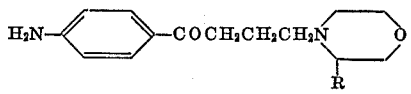

where R is an alkyl with 1–4 carbon atoms are new substances which can be used pharmaceutically. Their most characteristic effect is their ability to inhibit monoamine oxydase. They can be used as antidepressants. They may be produced from butyrophenone substituted in the γ-position and in the p-position of the benzene ring by substituents that can be readily replaced by the morpholino group and serve to establish the ring-bound amino group.

---

The present invention relates to new, pharmacologically valuable butyrophenone derivatives and processes for their manufacture.

The new butyrophenone derivatives have the general formula

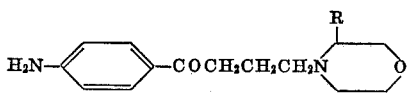

wherein R means hydrogen or an alkyl radical having 1–4 carbon atoms.

The invention extends to pharmaceutically acceptable addition salts of these derivatives.

The basic ketones and their salts are selective MAO-inhibitors and their substantial pharmacological properties are their activity as antidepressants useful for many clinical applications.

Compounds of the present invention may be prepared in manners known per se. The following three methods illustrate the invention without limiting the same.

(1) The compounds may be prepared by reacting a compound of the general formula

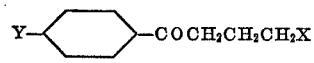

(X is a chlorine bromine or iodine atom and Y is a fluorine, chlorine or bromine atom) with a morpholine derivative of the general formula

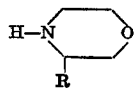

(where R has the same meaning given above) in the presence of an acid binding agent or in the presence of an excess of the morpholine derivative, preferably one molecular proportion in excess, to give a compound of the general formula

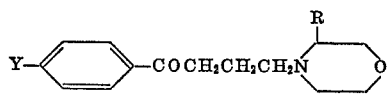

(where R and Y have the same meaning as given above).
This intermediate is reacted further with ammonia or sodium amide to give the desired compound. The reaction may be carried out in an inert solvent or diluent such as dimethylsulphoxide.

(2) The compounds may be prepared by reacting a compound of the general formula

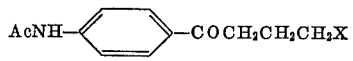

(X is a chlorine, bromine or iodine atom and Ac is a lower acyl) with a morpholine derivative of the general formula

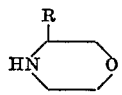

(where R has the same meaning given above) in the presence of an acid binding agent or in the presence of a large excess of the morpholine derivative to give a compound of the general formula

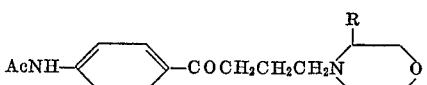

(where R and Ac have the same meaning as given above).
This intermediate is hydrolyzed by boiling in an aqueous solution of a mineral acid followed by alcalisation giving the desired basic butyrophenone.

(3) According to the invention the intermediates

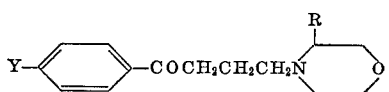

may be prepared by a Grignard synthesis by reacting the appropriate γ - (3 - alkylmorpholino)-butyronitrile with bromobenzene which may be fluorine, chlorine or bromine substituted in the p-position. The invention also includes the use, in this synthesis, of esters or acid halogenides,, especially the chlorides, instead of the above-mentioned nitrilo compounds. The use of the nitrilo derivatives of the morpholines are, however, preferred.

The γ - (3-alkylmorpholino)-butyonitrile used as the starting material may be prepared in any convenient manner as is known per se, e.g. through the following reaction steps.

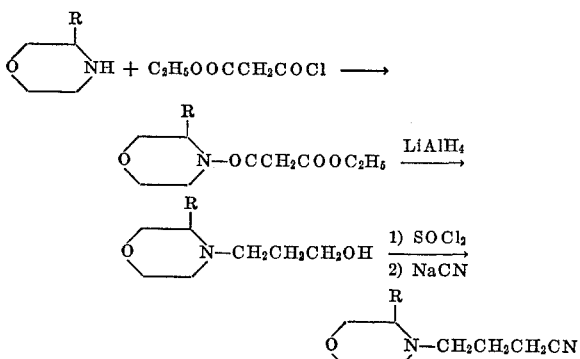

The γ - (3-alkylmorpholino)-butyronitrile so prepared is added, suitably in the form of an ether solution, to a Grignard solution prepared from mangesium and bromobenzene which optionally is fluorine, chlorine or bromine substituted in the p-position. The resulting mixture is then refluxed and after that decomposed, e.g. by adding water and a saturated ammonium chloride solution. The ketimine formed is present in the ether phase which is separated and evaporated to dryness in vacuum. To the residue 5 N HCl is added, and then the mixture is refluxed for about 20 hours for hydrolyzing the ketimine to the ketone, whereas the unreacted morpholine-substituted nitrile is hydrolyzed to the corresponding aminoacid which is not soluble in organic solvents. After cooling an excess of ammonia is added and the reaction mixture is extracted with ether. The ether phase is evaporated to dryness, and the residue is distilled.

The new compounds exert antireserpine, antitetrabenazine and anticonvulsant effects. The substances have selective MAO inhibitory action in vivo, and possess a remarkable antidepressant activity.

Table 1 and Table 2 show some registered effects of the compounds.

TABLE 1

| Substance | R | Reserpine antagonism, $ED_{50}$ mg./kg. | Tetra-benazine antagonism, $ED_{50}$ mg./kg. | MAO inhibition in vivo | Anticonvulsant effect, $ED_{50}$ mg./kg. (s.c.) | Acute toxicity, $LD_{50}$ mg./kg. (p.o.) |
|---|---|---|---|---|---|---|
| FG 5310 | —H | 2 | 30 | Selective | 15 | 650 |
| FG 5341 | —CH$_3$ | 5 | 5 | do | >20 | 350 |
| FG 5324 | —CH$_2$CH$_3$ | 35 | 8 | do | 35 | 400 |
| FG 5339 | —CH$_2$CH$_2$CH$_3$ | >10 | 10 | do | >10 | 125 |
| FG 5333 | —CH$_2$CH$_2$CH$_2$CH$_3$ | >10 | 10 | do | >10 | 90 |

TABLE 2

| Oral treatment | MAO inhibition in brain | |
|---|---|---|
| | Substrate kynuramine | Substrate 5 HT |
| FG 5310 (100 mg./kg.) | 62 | 93 |
| Isocarboxazid (40 mg./kg.) | 97 | 97 |
| Tranylcypromin (4 mg./kg.) | 90 | 92 |

Reserpine antagonism was studies in mice. The test compound was administered orally 3 times in 24 hours. Three hours after the last dose reserpine 1.0 mg./kg. was administered i.v. Ptosis was evaluated 3 hours after reserpine. The $ED_{50}$ is the dose protecting 50% against the reserpine-induced ptosis.

Tetrabenazine antagonism was investigated in rats. The test substance was administered orally to rats 3 times in 24 hours. Three hours after the last dose tetrabenazine 50 mg./kg. was administered i.p. Ptosis was evaluated 1 hour after tetrabenazine. The $ED_{50}$ is the dose protecting 50% against the tetrabenazine induced ptosis.

MAO inhibition in vivo was investigated by administering the test drug orally to mice. The animals were killed 3 hours after the treatment, the brain was taken out and the MAO activity was determined with different substrates Anticonvulsant effect was studied in the maximal electrochock test. Mice were fixed by electrode clamps in the skin of the neck and the tail. An electric current (120 v., 20 ma., 0.2 sec.) induced maximal tonic seizures. The test compound was administered s.c. 30 min. before the electrochock was applied. The $ED_{50}$ is the dose protecting 50% of the animals from tonic convulsions.

Acute toxicity was studied by oral administration to mice. FG 5310 shows the strongest inhibition with 5 HT as a substrate. FG 5310 inhibits mainly the harmine sensitive forms of MAO, whereas isocarboxazid and tranylcypromine inhibit both harmine sensitive and harmine resistant forms. Oral treatment with FG 5310 in dose up to 10 mg./kg. gives no tyramine potentiation and only weak MAO inhibition in liver and testine.

For many purposes a suitable clinical dose is between 1–500 mg. (calculated as base) administered three or four times daily. Naturally the dosage must be adjusted in accordance with the condition, age and weight of the patient.

The invention includes composition suitable for administration to human beings comprising the new compounds of the invention or acid addition salts thereof. Especially the hydrochlorides, together with an inert diluent or carrier or dissolved in water for injection.

Tablets may be made by compounding one of the new compounds or an acid addition salt thereof with customary carriers and adjuvants. The following is a suitable tablet formulation.

2.5 g. of the hydrochloride of γ-morpholino-p-aminobutyrophenone
2.0 g. of potato starch
1.0 g. of colloidal silica
2.5 g. of a 5% aqueous solution of gelatine
2.0 g. of talcum
0.2 g. of magnesium stearate.

This mixture is made up into 100 tablets, each, therefore containing 25 mg. of the active component.

The invention is further elucidated by the following non-limiting examples.

EXAMPLE 1

Preparation of γ-morpholino-p-aminobutyrophenone hydrochloride 100.3 g. (0.5 mole) of γ-chloro-p-fluorobutyrophenone, 87.1 g. (1.0 mole) morpholine and 250 ml. of toluene were introduced in a 1 l. reaction flask provided with a stirrer, a reflux condenser and a heating mantle. The reaction mixture was refluxed for 8 hours and then cooled to room temperature. The obtained amount of morpholine hydrochloride was sucked off and washed on the filter with three 50 ml. portions of toluene. The mother liquors were combined and 500 ml. of ether were added. The solution was washed with three 50 ml. portions of water and dried over sodium sulphate, filtrated and evaporated to dryness. The evaporation residue was distilled for obtaining 78 g. (62%) of the product, γ-morpholino-p-fluorobutyrophenone; boiling point 115–120° C./0.01 mm. Hg, M.P. 51–53° C.

78 g. (0.31 mole) γ-morpholino-p-fluorobutyrophenone, 25 g. liquid ammonia and 150 ml. dimethylsulfoxide were introduced in an autoclave and held at 130–140° C. for 70 hours. The reaction mixture was then cooled and poured into water (2 l.). An oil formed and was taken up in chloroform. The chloroform solution was washed with four 50 ml. portions of water and dried over sodium sulphate, filtrated and evaporated to dryness. The crystalline residue was recrystallized from ethanol to give 46 g. (60%) solid, melting at 131–133° C.

The hydrochloride was prepared in a manner known per se. Melting point 234–236° C.

*Analysis.*—Cl⁻ (calculated)=12.54%. Cl⁻ (found) =12.37%.

EXAMPLE 2

Preparation of γ-morpholino-p-aminobutyrophenone hydrochloride 47.9 g. (0.2 mole) of γ-chloro-p-acetamidobutyrophenone and 250 ml. of morpholine were introduced in a 500 ml. reaction flask provided with a stirrer, a reflux condenser and a heating mantle. The reaction mixture was refluxed for 21 hours and then evaporated to dryness. The residue was taken up in chloroform. The solution was washed with four 50 ml. portions of water, dried over sodium sulphate, filtrated and evaporated to dryness. The residue was recrystallized from benzene giving 39.5 g. (68%) of γ-morpholino-p-acetaminobutyrophenone melting at 121–122° C.

39.5 g. of γ-morpholino-p-acetamidobutyrophenone and 250 ml. of 5 N hydrochloric acid were introduced in a 500 ml. reaction flask provided with a reflux condenser and a heating mantle. The reaction mixture was refluxed for 3 hours, then cooled to room temperature and alcalized with 300 ml. of 5 N sodium hydroxide. An oil formed and was taken up in chloroform. The chloroform solution was washed with water, dried over sodium sulphate, filtrated and evaporated to dryness. The crystalline residue was recrystallized from ethanol to give 26.2 g. (79%) solid melting at 130–133° C.

The hydrochloride was prepared in a manner known per se. Melting point 234–236° C.

*Analysis.*—Cl⁻ (calculated)=12.45%. Cl⁻ (found) =12.31%.

EXAMPLE 3

Preparation of γ-(3-methylmorpholino)-p-aminobutyrophenone-p-toluenesulfonate 20.1 g. (0.1 mole) of γ-chloro-p-fluorobutyrophenone, 20.2 g. (0.2 mole) 3-methylmorpholine and 100 ml. of toluene were introduced in a 250 ml. reaction flask provided with a reflux condenser and a heating mantle. The reaction mixture was refluxed for 10 hours and then cooled to room temperature. The obtained amount of 3-methyl-morpholine hydrochloride was sucked off and washed on the filter with toluene. The mother liquors were combined and 500 ml. of ether were added. The solution was washed with water, dried over sodium sulphate, filtrated and evaporated to dryness. The evaporation residue was distilled for obtaining 17.2 g. (65%) of γ-(3-methyl-morpholino)-p-fluorobutyrophenone, boiling point 127–132° C./0.1 mm. Hg.

17.2 g. (0.065 mole) γ-3-(methylmorpholino)-p-fluorobutyrophenone, 10 g. liquid ammonia and 50 ml. dimethylsulfoxide were introduced in an autoclave and held at 130–140° C. for 70 hours. The reaction mixture was then cooled and poured into water (1 l.). An oil formed and was taken up in chloroform. The chloroform solution was washed with water and dried over sodium sulphate, filtrated and evaporated to dryness. The crystalline residue was recrystallized from ethanol to give 12.5 g. (73%) solid, melting at 62–67° C.

The p-toluenesulfonate was prepared in a manner known per se. Melting point 188–190° C.

*Analysis.*—Equivalent weight (calculated)=434.5. Equivalent weight (found)=435.0.

EXAMPLE 4

Preparation of γ-(3-tert-butylmorpholino)-p-aminobutyrophenone hydrochloride

To a Grignard solution prepared from 70.0 g. (0.4 mole) of p-fluoro-brombenzene and 9.8 g. (0.4 mole) of magnesium in 1000 ml. of ether 21.0 g. (0.1 mole) of γ-(3-tert-butylmorpholino)-butyronitrile in 250 ml. of tetrahydrofuran was added dropwise. After completed addition the reaction mixture was refluxed for 9 hours, whereupon water and finally a saturated ammonium chloride solution was added for decomposition of the reaction mixture. The ether phase was separated and the water phase extracted with ether. The combined ether solution was evaporated in vacuum. To the residue 500 ml. of 5 N hydrochloric acid was added and the mixture was refluxed for 30 hours. After cooling an excess of concentrated ammonia was added and the reaction mixture was extracted with ether. The ether solution was evaporated in vacuum and the residue was distilled. 23.1 g. (75%) of γ-(3 - tert-butylmorpholino)-p-fluorobutyrophenone was obtained at 140–145° C./0.1 mm. Hg.

23.1 g. (0.075 mole) of γ-(3-tert-butylmorpholino)-p-fluorobutyrophenone, 25 g. liquid ammonia and 50 ml. dimethylsulfoxide were introduced in an autoclave and held at 130–140° C. for 70 hours. The reaction mixture was then cooled and poured into 1 l. water. An oil formed and was taken up in chloroform. The chloroform was washed with water, dried over sodium sulphate, filtrated and evaporated to dryness. The residue was recrystallized from benzene:ligroin to give 15.1 g. (66%) solid, melting at 110–113° C.

The hydrochloride was prepared in a manner known per se. Melting point 215–217° C.

*Analysis.*—Cl⁻ (calculated)=10.41%. Cl⁻ (found) =10.50%.

Proceeding generally as described in Examples 1 to 4, the further compounds according to the invention anumerated in the table below were prepared.

TABLE
[Hydrochloric acid addition salts]

| Example | R | Melting point, °C. | Analysis (Cl⁻) percent Calc. | Found |
|---|---|---|---|---|
| 5 | C₂H₅ | 197–199 | 11.33 | 11.34 |
| 6 | n-C₃H₇ | 173–175 | 10.85 | 10.80 |
| 7 | iso-C₃H₇ | 197–199 | 10.85 | 10.78 |
| 8 | n-C₄H₉ | 177–180 | 10.41 | 10.50 |

What we claim is:

1. Para-amino - γ-morpholino-butyrophenone of the formula:

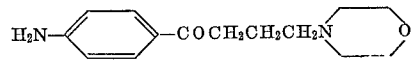

or pharmaceutically acceptable acid addition salts thereof.

References Cited
UNITED STATES PATENTS 3,151,124  9/1964  Huebner _____ 260—247.7 K
3,317,538  5/1967  Méier et al. _____ 260—268

OTHER REFERENCES

Jack et al.: Chemical Abstracts, vol. 64, 1966, p. 9738.

ALEX MAZEL, Primary Examiner

J. TOVAR, Assistant Examiner

U.S. Cl. X.R.

424—248